United States Patent
Inaba et al.

[19]

[11] Patent Number: 5,945,809
[45] Date of Patent: Aug. 31, 1999

[54] BATTERY PACK SHORT-CIRCUIT PROTECTION CIRCUIT AND METHOD

[75] Inventors: Tsutomu Inaba, Hachiouji; Eiji Nishio, Hino, both of Japan

[73] Assignee: Kabushiki Kaisha Toshiba, Kawasaki, Japan

[21] Appl. No.: 08/903,735

[22] Filed: Jul. 31, 1997

[30] Foreign Application Priority Data

Jul. 31, 1996 [JP] Japan .................................. 8-201920

[51] Int. Cl.[6] ..................................................... H02J 7/00
[52] U.S. Cl. .......................................... 320/134; 320/136
[58] Field of Search ..................................... 320/125, 134, 320/136, 145, 112

[56] References Cited

U.S. PATENT DOCUMENTS

| | | | |
|---|---|---|---|
| 5,477,130 | 12/1995 | Hashimoto et al. | 320/164 |
| 5,744,937 | 4/1998 | Cheon | 320/125 |
| 5,801,514 | 9/1998 | Saeki et al. | 320/136 |

*Primary Examiner*—Peter S. Wong
*Assistant Examiner*—Lawrence Luk
*Attorney, Agent, or Firm*—Limbach & Limbach L.L.P.

[57] ABSTRACT

A battery pack short-circuit protection circuit and a method whereby fire damage etc. of a battery pack caused by short-circuiting of terminals by metal objects etc., which cannot be prevented simply by an over-current cut-off switch, can be reliably prevented. In a current path between a battery pack charging/discharging terminal of the battery pack and a battery cell in the battery pack, there is provided a switching circuit that effects opening and closing of the current path; a switch drive circuit is provided that drives the switching circuit; the switching circuit closes the current path only when a drive control signal is applied through a control terminal from the charging/discharging device or the main unit of the equipment.

16 Claims, 5 Drawing Sheets

BATTERY PACK SHORT-CIRCUIT PROTECTION CIRCUIT AND METHOD

BACKGROUND OF THE INVENTION

1. Field of the Invention

The present invention relates to a short-circuit protection circuit and method for preventing the risk of a battery pack generating heat etc. caused by short-circuiting of the charging terminals of the battery pack, which is used in equipment such as portable telephone terminals.

2. Description of the Related Art

Typically, portable telephone terminals are provided with a battery pack constituting a part of the portable telephone terminal and mounted in a detachable condition; the terminal is operated using the power supplied from this battery pack.

FIG. 6 is a view showing the layout of a portable telephone terminal 50 on which is mounted a conventional battery pack 70, and a charging/discharging device 60.

In FIG. 6, portable telephone terminal 50 is arranged such that power supplied from battery pack 70 is input through terminals CC71b and CC72b; this input power is used by power source circuit 59 to generate the necessary power for the various units constituting portable telephone terminal 50, this power which is thus generated being supplied to the various units constituting portable telephone terminal 50. That is, this portable telephone terminal 50 is operated by the power supplied from power source circuit 59 using the power supplied from battery pack 70.

For example, the voice signal that is input from microphone 54 is modulated on the local signal from frequency synthesizer 55 and amplified by transmission unit 53, being converted to a radio frequency signal; this radio frequency signal is then transmitted through antenna duplexer circuit 52 and antenna 51.

Also, the radio frequency signal received through antenna 51 and antenna duplexer circuit 52 is amplified and demodulated using the local signal from frequency synthesizer 55, being thereby converted to a voice signal, which voice signal is then output from speaker 57.

Control circuit 58 controls transmission unit 53, reception unit 56 and frequency synthesizer 55 etc.

This control circuit, transmission unit 53, reception unit 56, and frequency synthesizer 55 etc. are then operated by the power supplied from power source circuit 59 using the power supplied from battery pack 70.

Battery pack 70 comprises: a battery cell 71, an over-current cut-off switch 72 connected in series with battery cell 71 and that cuts this off if the current flowing in battery cell 71 is excessive, a thermistor 73 for measuring the temperature inside battery pack 70, a plus terminal CC71a and a minus terminal CC72a for supplying power from battery cell 71 to the power source circuit 59 of portable telephone terminal 50, a plus charging/discharging terminal C71a connected to charging/discharging device 60, a minus charging/discharging terminal C74a, a type-identifying terminal C72a for identifying the type of the capacity of battery pack 70, and a temperature terminal C73a for extracting the temperature detected by thermistor 73.

Charging/discharging device 60 comprises: charging/discharging circuit 62 holding a resistor in its interior whereby discharging of battery pack 70 is performed and generating voltage/current used to charge battery pack 70 from the commercial power source supplied through a power plug 64, a charging/discharging control circuit 61 that effects control of charging in respect of battery pack 70 and control of discharging by pressing a discharging switch 63, terminal C71b connected with plus charging/discharging terminal C71a of battery pack 70, terminal C74b connected with minus charging/discharging terminal C74a, terminal C72b connected with type identification terminal C72a, and terminal C73b connected with temperature terminal C73a.

Thus, when charging/discharging of battery pack 70 is effected, terminals C71b–C74b of charging/discharging device 60 are connected to respective terminals C71a–C74a of battery pack 70 to perform charging/discharging. Thus the circuit is constituted such that charging/discharging current flows by connection of terminals C71a, C71b and terminals C74a, C74b respectively to the plus and minus terminals of the battery cell.

Terminal C72a detects the capacity type of battery pack 70: if battery pack 70 is of large-capacity type, this terminal C72a is connected to the minus terminal of battery cell 71 as shown in the drawing; if it is of small capacity, this terminal C72a is released from the minus terminal of battery cell 71.

Specifically, when this terminal C72a is connected to charging/discharging control circuit 61 through terminal C72b, charging/discharging control circuit 61 uses the signal from terminal C72b to detect whether this terminal C72a is connected to or is released from the minus terminal of battery cell 71, and, in accordance with the result of this detection, identifies the capacity type of this battery pack 70.

Also, terminal C73a is a terminal for detecting the temperature of battery pack 70 by detecting the current or voltage flowing in thermistor 73, and is connected to charging/discharging control circuit 71 through terminal C73b.

Charging is performed by connecting charging/discharging device 60 to battery pack 70. When battery pack 70 is connected, charging/discharging control circuit 61 identifies the capacity of battery pack 70 from the condition of terminal C72a and specifies to charging/discharging circuit 62 a charging current corresponding to the result of this identification; charging/discharging circuit 62 then generates the specified charging current and commences charging of the battery pack through terminals C71a, C71b and terminals C74a, C74b. Charging/discharging control circuit 61 then detects the temperature in the battery pack by means of the current through thermistor 73 and terminals C73a, C73b; if the detected temperature is more than a prescribed value, it instructs charging/discharging circuit 62 to cease charging; charging/discharging circuit 62 thereupon ceases charging. The battery pack can thereby be prevented from catching fire due to generation of heat etc.

Discharge is also effected by connecting charging/discharge device 60 to battery pack 70. However, when such discharge is performed, discharge switch 63 is depressed, so, in response to the depression of this discharging switch 63, charging/discharge control circuit 61 instructs connection of charging/discharging circuit 62 to a prescribed load resistor.

A closed circuit is thereby produced through the prescribed load resistor of charging/discharging circuit 62, terminals C71a, C71b, battery cell 71, and terminals C74a, C74b, and discharging is commenced. It may be remarked that the reason why discharging of battery cell 71 is performed is in order to eliminate the memory effect of the battery produced by repeated incomplete charging and discharging.

However, if a piece of metal or the like accidentally came into contact with terminals C71a–C74a of battery pack 70, current flowed from the plus terminal C71a through the piece of metal to the minus terminal C74a, or, if terminal C72a was connected to the minus terminal of battery cell 71, current flowed from the plus terminal C71a through the piece of metal to this terminal C72a, giving rise to the risk of generation of smoke from material in the vicinity or catching fire due to generation of heat by the piece of metal etc. Conventionally however this danger was forestalled by current cut-off by over-current cut-off switch 72 or detection of the temperature of the interior of battery pack 70 by means of thermistor 73.

As described above, if a large current flowed due to short-circuiting etc., the resistance of over-current cut-off switch 72 abruptly increased, thereby cutting off the current. The current value at which current was cut off by this over-current cut-off switch 72 was termed the "trip current".

However, if a metal object such as a chain accidentally comes into contact with terminals C71a–C74a of battery pack 70, since the resistance of a metal object such as this chain is several Ω, a current of the order of several hundred mA, which is lower than the trip current, flows in the over-current cut-off switch 72.

As a result, generation of heat due to Joule heating by this current continues without actuation of over-current cut-off switch 72, with the result that the equipment may catch fire; there was therefore the problem that the risk of damage due to catching fire could not reliably be prevented.

SUMMARY OF THE INVENTION

Accordingly, it is an object of the present invention to provide a battery pack short-circuit protection circuit and a method whereby the above problems are eliminated and fire damage produced by short-circuiting of the terminals by metal objects can be reliably prevented.

In order to achieve this object, a battery pack short-circuit protection circuit according to the invention of claim 1 comprises:

switching means provided on a current path between one of charging/discharging terminals of a battery pack to be connected to a charging/discharging device and a battery cell in the battery pack, for opening and closing the current path;

switch driving means for controlling the switching means to close when the switch driving means receives a drive control signal from the charging/discharging device and for controlling the switching means to open when the switch driving means does not receive the drive control signal; and a control terminal for applying the drive control signal to the switch driving means when the battery pack is attached to the charging/discharging device.

Further, the invention of claim 2 is constituted such that in the invention of claim 1, the drive control signal is generated within the charging/discharging device, and the control terminal is connected to the charging/discharging device simultaneously on connection of the charging/discharging terminal of the battery pack to the charging/discharging device, and the drive control signal generated in the charging/discharging device is applied to the switch driving means through the control terminal.

Further, the invention of claim 3 is constituted such that in the invention of claim 1, the drive control signal is generated within an equipment on which the battery pack is mounted, and the control terminal is connected to the equipment when the battery pack is mounted on the equipment, and the drive control signal generated within the equipment is applied to the switch driving means through the control terminal.

Further, the invention of claim 4 is constituted such that in the invention of claim 3, the equipment includes a charging/discharging control switch and, the drive control signal is generated when the charging/discharging control switch is enabled.

Further, the invention of claim 5 is constituted such that in the invention of claim 1, the drive control signal is generated within the charging/discharging device and is generated within the equipment on which the battery pack is mounted; and the control terminal comprises a first control terminal to be connected to the charging/discharging device and a second control terminal to be connected to the equipment, and application of the drive control signal to the switch driving means is performed from the charging/discharging device through the first control terminal or from the equipment through the second control terminal.

Further, the invention of claim 6 is constituted such that in the invention of claim 1, the switching means is provided on a current path that connects a plus terminal of the charging/discharging terminals and a plus terminal of the battery cell.

Further, the invention of claim 7 is constituted such that in the invention of claim 1, the switching means is provided on a current path that connects a minus terminal of the charging/discharging terminal and a minus terminal of the battery cell.

Further, the invention of claim 8 is constituted such that in the invention of claim 1, an operating level of the switch driving means is set to a different value in accordance with the type of capacity of the battery cell of the battery pack in which the switch driving means is incorporated, and the charging/discharging device comprises:

drive control signal generating means for generating drive control signals of a plurality of levels;

decision means for deciding the type of capacity of the battery pack from a level of a drive control signal generated by the drive control signal generating means when the switch driving means is operated; and charging/discharging control means for controlling charging/discharging of the battery cell of the battery pack in accordance with the type of capacity of the battery pack decided by the decision means.

Further, a battery pack according to the invention of claim 9 comprises:

a battery cell;

a plus charging/discharging terminal connected to a plus terminal of the battery cell through a first current path and connected to a charging/discharging device when the battery cell is charged or discharged;

a minus charging/discharging terminal connected to a minus terminal of the battery cell through a second current path and connected to the charging/discharging device when the battery cell is charged or discharged;

switching means provided on one of the first current path and the second current path, for opening and closing one of the first current path and the second current path;

switch driving means for controlling the switching means to close when the switch driving means receives a drive control signal from the charging/discharging device and for controlling the switching means to open when the switch driving means does not receive the drive control signal; and a control terminal for applying the drive control signal to the switch driving means when the battery cell is charged or discharged.

Further, the invention of claim 10 is constituted such that in the invention of claim 9, the drive control signal is generated within the charging/discharging device, and the control terminal is connected to the charging/discharging device simultaneously on connection of the charging/discharging terminal of the battery pack to the charging/discharging device, and the drive control signal generated within the charging/discharging device is applied to the switch driving means through the control terminal.

Further, the invention of claim 11 is constituted such that in the invention of claim 9, the drive control signal is generated within the equipment on which the battery pack is mounted, and the control terminal is connected to the equipment on mounting of the battery pack on the equipment, and the drive control signal generated within the equipment is applied to the switch driving means through the control terminal.

Further, the invention of claim 12 is constituted such that in the invention of claim 11, the equipment includes a charging/discharging control switch and, the drive control signal is generated when the charging/discharging control switch is enabled.

Further, according to the invention of claim 13, in the invention of claim 9, there is further provided an over-current cut-off switch connected in series with the battery cell and whereby a charging/discharging current in respect of the battery cell is cut off if it exceeds a pre-set prescribed value.

Further, according to the invention of claim 14, in the invention of claim 9, there is further provided:

temperature detection means provided within the battery pack, for detecting a temperature within the battery pack; and a temperature detection terminal that transmits temperature information indicating the temperature detected by the temperature detection means to the charging/discharging device; and the charging/discharging device comprises:

charging/discharging interruption control means for interrupting charging/discharging of the battery cell of the battery pack when the temperature indicated by the temperature information transmitted through the temperature detection terminal on charging/discharging of the battery cell of the battery pack exceeds a pre-set prescribed value.

Further, in a battery pack short-circuit protection method according to the invention of claim 15, there is provided in a battery pack switching means on a current path between a charging/discharging terminal of the battery pack connected to a charging/discharging device and a battery cell within the battery pack, for opening and closing the current path, and there is provided switch driving means for controlling the switching means to close when the switch driving means receives a drive control signal from the charging/discharging device and for controlling the switching means to open when the switch driving means does not receive the drive control signal, the method comprising:

a first step wherein the switching means is controlled to close by application of the drive control signal generated in the charging/discharging device to the switch driving means in a condition in which the battery pack is connected to the charging/discharging device; and a second step wherein the switching means is controlled to open by the drive control signal generated by the charging/discharging device ceasing to be applied to the switch driving means in a condition in which the connection of the battery pack is removed form the charging/discharging device.

Further, in a battery pack short-circuit protection method according to the invention of claim 16, there is provided, in a battery pack, switching means on a current path between a charging/discharging terminal of the battery pack connected to a charging/discharging device and a battery cell in the battery pack, for opening and closing the current path, and there is provided switch driving means for controlling the switching means to close when the switch driving means receives a drive control signal from the charging/discharging device and for controlling the switching means to open when the switch driving means does not receive the drive control signal, the method comprising:

a first step wherein the switching means is controlled to close by application of the drive control signal generated by the equipment to the switch driving means when the battery pack is connected to the charging/discharging device for charging/discharging of a battery cell of the battery pack in a condition with the battery pack mounted on the equipment; and a second step whereby the switching means is controlled to open by the drive control signal gene rated by the equipment ceasing to be applied to the switch driving means on release of the connection of the battery pack and the charging/discharging device.

Thus, with the present invention, due to the fact that a construction is adopted where by switching means are provided on a current path between a charging/discharging terminal of the battery pack in the battery pack and a battery cell in this battery pack, whereby the current path is opened or closed, and that switch driving means is provided that drives the switching mean such that the switching means closes the current path only when the drive control signal is applied through a control terminal from the charging/discharging device or the main unit of the equipment, fire damage etc. produced by short-circuiting can be reliably prevented even if the terminals of the charging/discharging device are short-circuited by contact of a metal object with the charging/discharging terminals of the battery pack.

Also, with this invention, the battery capacity of the battery pack can be identified from the magnitude of the drive control signal that drives the switch driving means so flexible charging control can be achieved using the results of this identification.

DESCRIPTION OF THE PREFERRED EMBODIMENTS

An embodiment of the present invention is described below with reference to the drawings.

Figure 1:
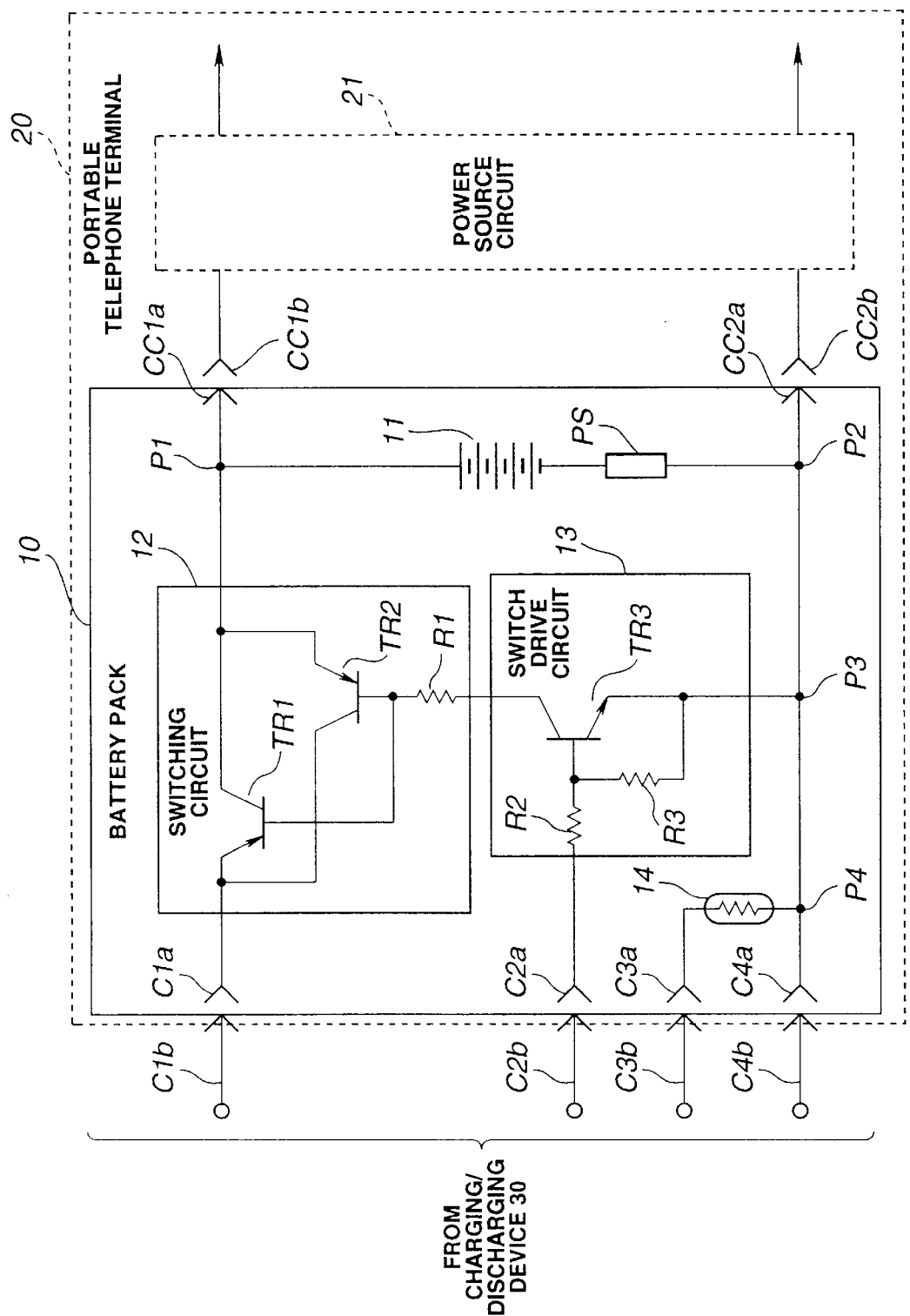
FIG. 1 is a view showing the layout of a portable telephone terminal including a battery pack according to an embodiment of the present invention.

FIG. 1 is a view showing the layout of a portable telephone terminal including a battery pack constituting an embodiment of the present invention.

In FIG. 1, battery pack 10 is installed as a part of portable telephone terminal 20; this battery pack 10 is constructed so as to be capable of being attached and released from the main unit of portable telephone terminal 20.

In the condition in which battery pack 10 is mounted in the main unit of portable telephone terminal 20 shown in FIG. 1, battery pack 10 is connected to power source circuit 21 within portable telephone terminal 20 by means of terminals CC1a, CC1b and terminals CC2a, CC2b. Power source circuit 21 within the main unit of portable telephone terminal 20 then uses the DC power source of battery pack 10 supplied from terminals CC1b, CC2b to generate and supply the power source voltages and currents needed for operation of the various units, not shown, of the main unit of portable telephone terminal 20.

Also, battery pack 10 is connected, when charging/discharging is required, to a charging/discharging device 30, to be described, through respective terminals C1a, C1b, terminals C2a, C2b, terminals C3a, C3b, and terminals C4a, C4b.

Battery pack 10 comprises: battery cell 11 constituting the power source for the main unit of portable telephone terminal 20, switching circuit 12 connected between terminals C1a and the plus terminal of battery cell 11, switch drive circuit 13 that performs drive control of the opening/closing operation of switching circuit 12, thermistor 14, and overcurrent cut-off switch PS that cuts off current by a rapid increase in resistance when over-current (current above a prescribed trip current) flows in battery cell 11.

Terminal C1a is the plus terminal of charging/discharging device 30 during charging/discharging; terminal C4a is the minus terminal of charging/discharging device 30 during charging/discharging.

Terminal C2a is a terminal that inputs a drive control signal that controls switch drive circuit 13 and that serves to identify the capacity of the battery; terminal C3a is a terminal to detect the temperature within battery pack 10 from the current flowing in thermistor 14.

Switching circuit 12 is connected between a point P1 on the plus side of battery cell 11 and terminal C1a which constitutes the plus charging/discharging terminal; it comprises transistors TR1 and TR2 and resistor R1; under the control of a drive signal from switch drive circuit 13, these respectively open and close in one direction between point P1 and terminally C1a.

This resistor R1 is connected to the bases of transistors TR1, TR2. Consequently, when a prescribed voltage is applied to the bases of transistors TR1, TR2, transistors TR1 and TR2 are put into ON condition and closure i.e. connection is effected between terminal C1a and the plus terminal of battery cell 11 i.e. point P1.

Also, if the voltage that is applied to the bases of transistors TR1, TR2 is below the prescribed voltage, transistors TR1 and TR2 are put into the OFF condition and the connection between terminal C1a and plus terminal P1 of battery cell 11 is open-circuited.

Switch drive circuit 13 is connected to terminal C2a and connected between switching circuit 12 and P3 between terminal C4a constituting the minus charging/discharging terminal and point P2 on the minus side of battery cell 11.

Switch drive circuit 13 comprises a transistor TR3, a resistor R2 that is connected to the base of transistor TR3, and a resistor R3 that is connected between the base and emitter of transistor TR3. The emitter of transistor TR3 is connected to point P3, while the collector of transistor TR3 is connected through resistor R1 with the bases of transistors TR1, TR2 of switching circuit 12. Also, the base of transistor TR3 is connected to terminal C2a through resistor R2. Consequently, when a drive control signal having a prescribed voltage is input to the base of transistor TR3 from terminal C2a, transistor TR3 goes into the ON condition, causing transistors TR1 and TR2 of switching circuit 12 to go into the ON condition, thereby closing the connection between terminal C1a and point P1 of the plus terminal of battery cell 11.

Thermistor 14 is connected between terminal C3a and P4 between terminal C4a and point P2 on the minus side of battery cell 11; it detects the temperature within this battery pack 10 and, when it has done this, outputs a detection signal from terminal C3a.

Next, the layout of charging/discharging device 30 will be described with reference to FIG. 2.

Figure 2:
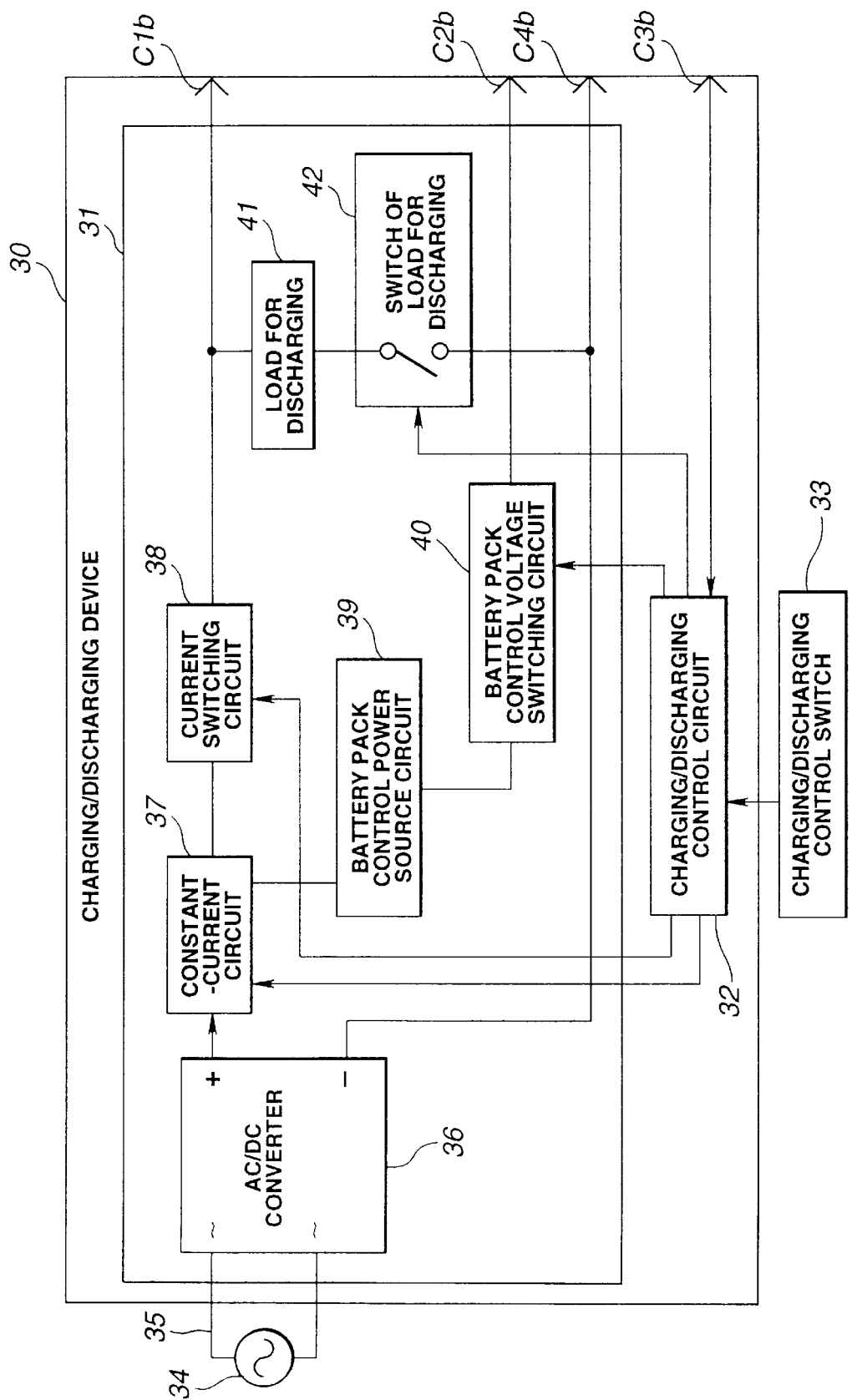
FIG. 2 is a view showing the layout of a charging/discharging device to which this battery pack is connected in order to effect charging/discharging of the battery cells of the battery pack shown in FIG. 1.

In FIG. 2, charging/discharging device 30 comprises a charging/discharging circuit 31 and charging/discharging control circuit 32.

Charging/discharging circuit 31 comprises: an AC/DC converter 36 that converts AC current input from mains power source 34 through a power cable 35 to DC; a constant-current circuit 37 connected to the plus terminal of the AC/DC converter that outputs as a prescribed constant-current source the DC current obtained by conversion by AC/DC converter 36, further under the control of charging/discharging control circuit 32; a current switching circuit 38 connected to terminal CC1b and that switches the current from constant-current circuit 37 under the control of charging/discharging control circuit 32; a battery pack control power source circuit 39 that extracts a battery pack control voltage from a current branched from constant-current circuit 37; a battery pack control voltage switching circuit 40 that performs switching whereby a drive control signal based on the battery pack control voltage extracted from battery pack control power source circuit 39 is applied to switch drive circuit 13 of battery pack 10 shown in FIG. 1 through terminals C2b and C2a under the control of charging/discharging control circuit 32; discharging load 41 used during discharge of battery pack 11; and discharging load switch 42 that connects discharging load 41 under the control of charging/discharging control circuit 32 when discharging is specified by charging/discharging control switch 33.

The minus terminal of AC/DC converter 36 is connected to terminal C4b.

Also, charging/discharging control circuit 32 performs control of the various units described above based on the input from charging/discharging control switch 33 and the input from terminal C3b that inputs the current of battery pack 10 through thermistor 14 shown in FIG. 1.

Next, the charging/discharging action in respect of battery pack 10 will be described with reference to FIG. 1 and FIG. 2. In this description, it will be assumed that battery pack 10 terminals C1a, C2a, C3a, C4a are already in a condition connected to respective charging/discharging device 30 terminals C1b, C2b, C3b, C4b.

First of all, when battery cell 11 of battery pack 10 is being charged, a charging instruction is input to charging/discharging control circuit 32 by charging/discharging control switch 33.

Charging/discharging control circuit 32 turns battery pack control voltage switching circuit 40 ON in response to a charging instruction input from charging/discharging control switch 33, and outputs to the base of transistor TR3 of switch drive circuit 13 shown in FIG. 1a drive control signal having a prescribed voltage, through terminals C2b, C2a and resistor R2.

Transistor TR3 turns ON when a drive control signal is input from its base, causing a prescribed load voltage to be applied to transistors TR1, TR2 of switching circuit 12. Then, in response to application of this prescribed load voltage, transistor TR1 turns ON and conducts in the direction of point P1 from terminal C1a; transistor TR2 also turns ON, and conducts in the direction of terminal C1a from point P1.

Charging/discharging control circuit 32 also turns ON current switching circuit 38 causing it to conduct a current from constant-current circuit 37.

As a result, a closed circuit is formed consisting of: AC/DC converter 36 V6→constant-current circuit 37→current switching circuit 38→terminal C1b→terminal C1a transistor TR1→point P1→battery cell 11→poly switch PS→point P2→terminal C4a→AC/DC converter 36, and a prescribed fixed current from constant-current circuit 37 generated under the control of charging/discharging control circuit 32 flows through this closed circuit, charging up battery cell 11.

If, during charging of battery cell 11 of battery pack 10, a rise in temperature in battery pack 10 is detected by a change in the resistance of thermistor 14, this is transmitted to charging/discharging control circuit 32 through terminals C3a, C3b; charging/discharging control circuit 32 thereby ascertains abnormality of the battery, and immediately stops charging.

In more detail, in these circumstances, charging/discharging control circuit 32 turns current switching circuit 38 OFF and turns battery pack control voltage switching circuit 40 OFF; as a result, switch drive circuit 13 of battery pack 10 turns transistors TR1 and TR2 of switching circuit 12 OFF, thereby stopping charging of battery pack 10 by opening the current path between terminal C1a and point P1.

The temperature in battery pack 10 then drops and, when a normal temperature is detected by charging/discharging control circuit 32, a closed circuit is again constituted to allow charging current to flow so as to perform charging as described above.

This embodiment is also constituted so as to identify the capacity of battery pack 10 by using the drive control signal output from battery back control voltage switching circuit 40 when charging is performed.

Identification of the capacity type of this battery pack 10 can be achieved by altering the setting of the values of resistors R2, R3, or their ratio, in battery pack 10, these values being characteristic of each battery pack.

Specifically when performing charging, a drive control signal having a prescribed voltage must be input from terminal C2a in order to turn transistor TR3 of switch control circuit 13 of battery pack 10 ON; the voltage of the drive control signal at which this transistor TR3 turns ON is determined by resistors R2, R3.

The type of the battery of battery pack 10 is then identified by setting the values of resistors R2, R3 in battery pack 10, or their ratio, as characteristic values corresponding to the capacity type of this battery pack and altering the voltage of the drive control signal that is output from battery pack control voltage switching circuit 40 from for example a small value and using the charging/discharging control circuit 32 to detect the voltage of the drive control signal at the point when transistor TR3 of the battery pack turns ON i.e. at the point where charging/discharging is commenced.

Charging/discharging control circuit 32 of charging/discharging device 30 then executes charging of the battery pack with an appropriate charging current corresponding to the requested type of battery pack, by controlling constant-current circuit 37 in accordance with the requested type of battery back that has been detected.

Thus, with this construction, it is possible to cope with the situation that battery packs 10 are of a large number of capacity types.

Next, the case where battery cell 11 of battery pack 10 is discharged will be described. In this case, a discharge instruction is input from charging/discharging control switch 33 to charging/discharging control circuit 32. When this discharging instruction is input, charging/discharging control circuit 32 turns ON discharge load switch 42.

Current switching circuit 38 and switching circuit 12 are thereupon put in OFF condition. After this, charging/discharging control circuit 32 instructs battery pack control voltage switching circuit 40 to output a drive control signal; this battery pack control voltage switching circuit 40 thereupon outputs a drive control signal through terminals C2b, C2a to switch drive circuit 13 of battery pack 10; as a result, switch drive circuit 13 turns ON, thereby turning switching circuit 12 ON.

As a result, a closed circuit is constituted consisting of: discharge load 41→terminal C1b→terminal C1a→switching circuit 12→point P1→battery cell 11→poly switch PS→point P2→terminal C4a→terminal C4b→discharge load switch 42→discharge load 41, and discharge of battery cell 11 is effected by discharge load 41.

It should be noted that, whether during charging or discharging, if a current in excess of the trip current referred to above flows through over-current cut-off switch PS, its resistance increases, cutting off the current.

Let us now consider the case where with the above construction, a metal object or the like has effected contact between for example terminal C1a and terminal C4a of battery pack 10 whilst for example battery pack 10 is not connected to charging/discharging device 30. In this case, a drive control signal is not applied to switch drive circuit 13 of battery pack 10, so switch circuit 12 does not go into the open condition and current does not flow in this metal object or the like; consequently, there is no possibility of this metal object getting heated up, so reliable protection against short-circuiting can be achieved.

Next, a first embodiment of the present invention will be described.

In the battery pack 10 shown in FIG. 1, switching circuit 12 is connected between terminal C1a and point P1 i.e. to the plus terminal of battery cell 11.

However, since this switching circuit 12 could perform opening/closure of the closed circuit on either charging or discharging of battery cell 11, it could be connected to the minus side of battery cell 11.

Figure 3:
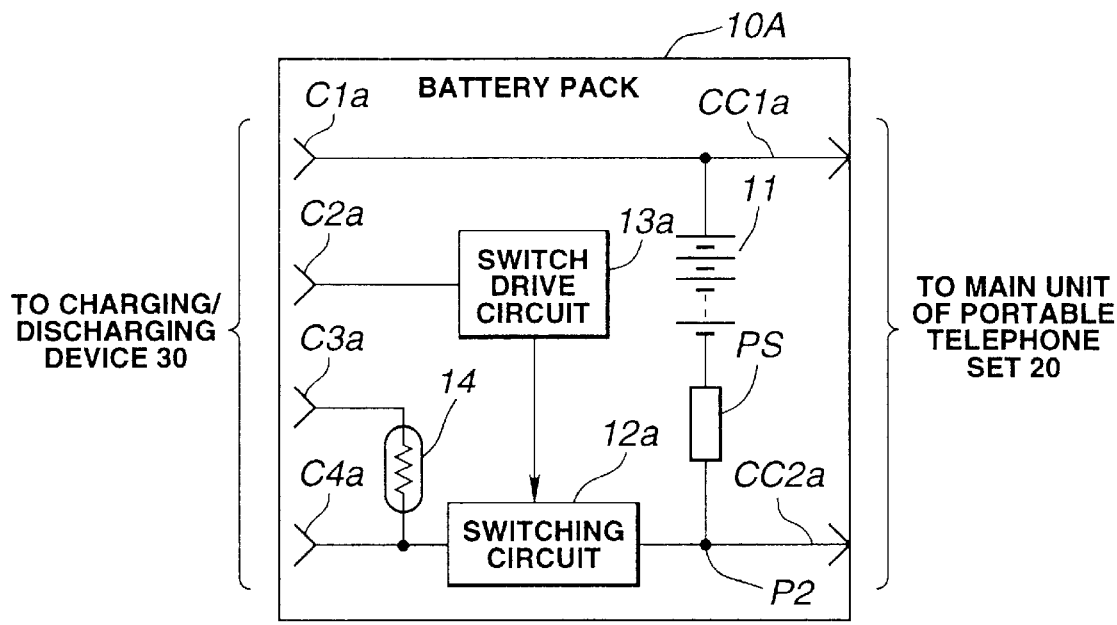
FIG. 3 is a view showing the layout of a battery pack illustrating a first embodiment of the present invention.

In more detail, FIG. 3 is a view showing a diagrammatic layout of a first embodiment of the present invention; in FIG. 3, a switching circuit 12a having the same function as switching circuit 12 shown in FIG. 1 is connected between terminal C4a and point P2, which is on the minus side of battery cell 11.

Also, a switch drive circuit 13a having the same function as switch drive circuit 13 shown in FIG. 1 is connected to terminal C2a.

Thus, this switch drive circuit 13 drives switching circuit 12a in accordance with a drive control signal from terminal C2a. Of course, the direction of the drive voltage with respect to the transistors, not shown, in switching circuit 12a by the transistor, not shown, in switch drive circuit 13a must be maintained.

The battery pack 10A shown in FIG. 3 will therefore have exactly the same function and performance as the battery pack 10 shown in FIG. 1.

It should be noted that battery pack 10A shown in FIG. 3 is just an example of application of battery pack 10; the important thing is that a switching circuit 12 driven by a switch drive circuit 13 can be connected on a closed circuit formed on charging or discharging in battery pack 10.

Next, a second embodiment of the present invention will be described.

Figure 4:
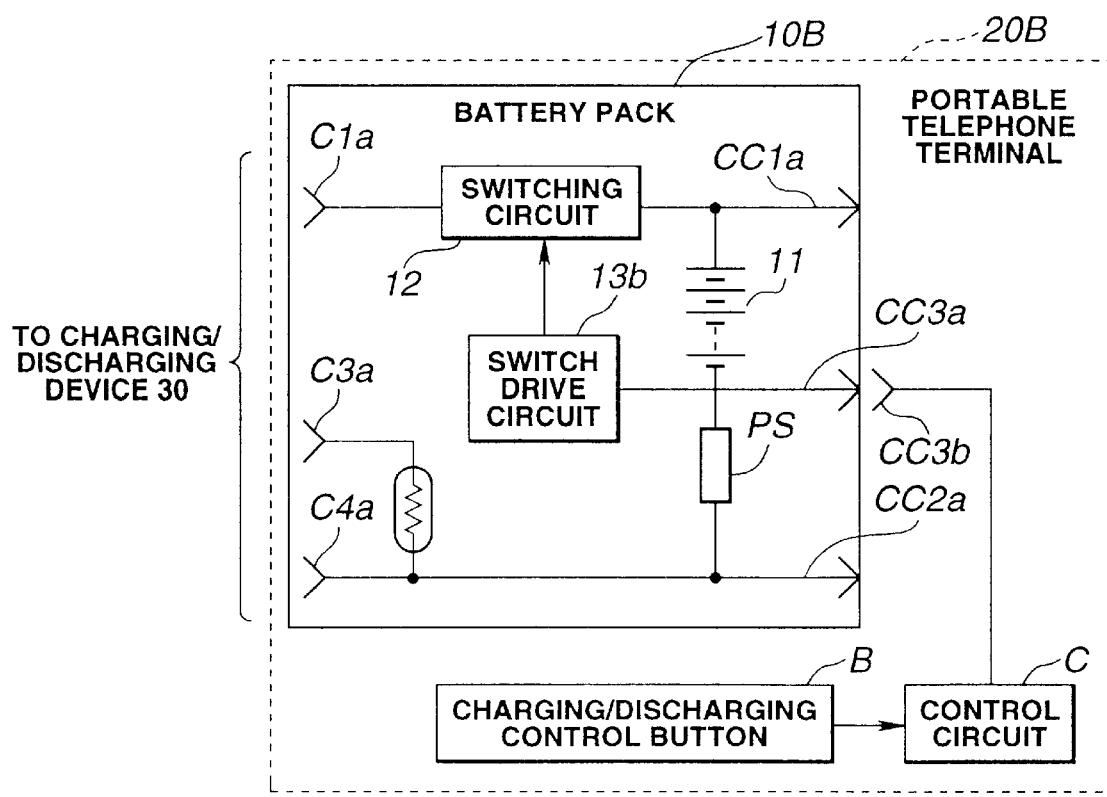
FIG. 4 is a view showing the layout of a battery pack illustrating a second embodiment of the present invention.

FIG. 4 is a view showing the layout of a battery pack illustrating a second embodiment of the present invention. Switch drive circuit 13b in FIG. 4 is not driven by a drive control signal from charging device 30 through terminal C2a but drives switching circuit 12 by means of a drive control signal from the main unit of portable telephone terminal 20B. For this purpose, a charging/discharging control button B is connected to control circuit C that controls the various units in portable telephone terminal 20B, not shown, in the main unit of portable telephone terminal 20B. On pressing this charging/discharging control button B, control circuit C controls the drive of switch drive circuit 13b through terminals CC3b, CC3a.

Specifically, charging/discharging control button B is only depressed during charging or discharging; in response to this depression, control circuit C drives switch drive circuit 13b, and exercises control to close switching circuit 12.

By this means, charging/discharging of battery pack 10B can be controlled even from portable telephone terminal 20B; consequently, this can be used even in the case of an ordinary construction in which for example the charging/discharging device to which this battery pack 10B is connected does not have a battery pack control power source circuit 39 or battery pack control voltage switching circuit 40 as shown in FIG. 2.

Next, a third embodiment of the present invention will be described.

Figure 5:
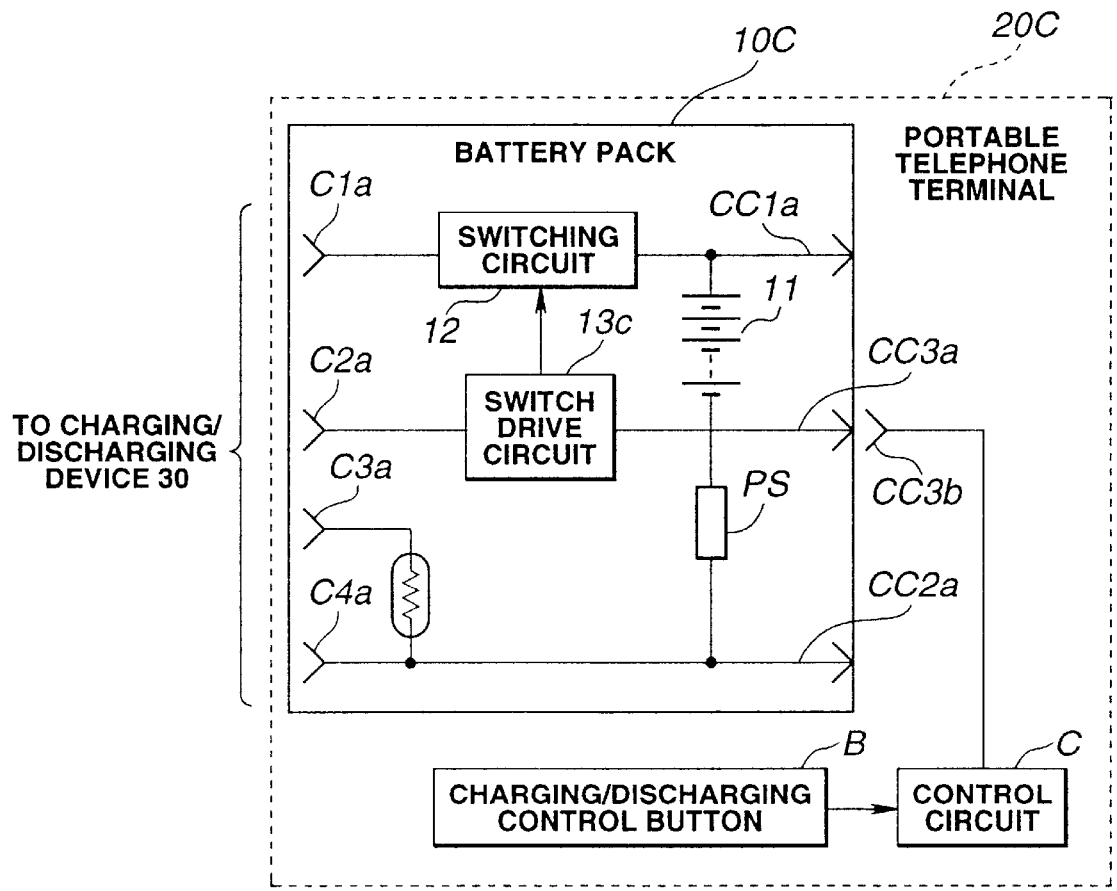
FIG. 5 is a view showing the layout of a battery pack illustrating a third embodiment of the present invention.
Figure 6:
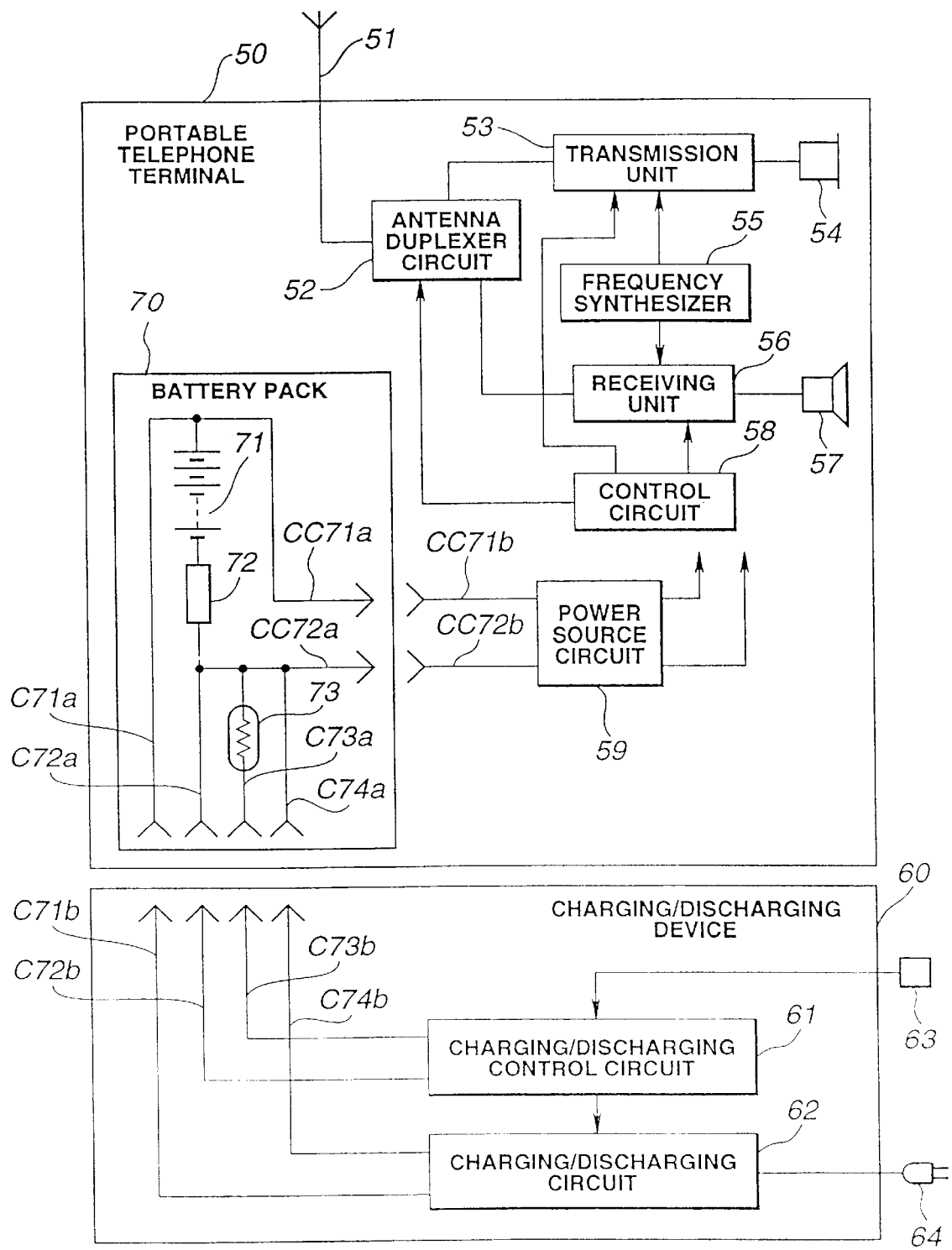
FIG. 6 is a view showing the layout of a charging/discharging device and portable telephone terminal in which a prior art battery pack is mounted.

FIG. 5 is a view showing the layout of a battery pack illustrating a third embodiment of the present invention; switch drive circuit 13c in FIG. 5 is driven and controlled by a drive control signal from terminal C2a just as battery pack 10 shown in FIG. 1, and is arranged to be capable of being driven and controlled by a drive control signal from terminal CC3a just as battery pack 10B shown in FIG. 4.

With such a construction, the charging/discharging device to which this battery pack 10C is connected can be used both with arrangements in which, as shown in FIG. 2, there are provided a battery pack control power source circuit 39 and battery pack control voltage switching circuit 40 etc., or with arrangements of the ordinary construction in which battery pack control power source circuit 39 and battery pack control voltage switching circuit 40 etc. are not provided.

It should be noted that, although transistors were employed as the switching elements of the switch drive circuit and switching circuit in the embodiment described above and the examples of its application, it would for example be possible to employ FETs instead of the transistors or mechanical relays or electrical relays using semiconductor relays.

Also, although a prescribed voltage was applied to the base of transistor TR3 in order to turn the switch drive circuit ON, there is no restriction to this and transistor TR3 could be turned ON by passage of a prescribed current.

What is claimed is:

1. A short-circuit protection circuit for a battery pack build in a terminal device operated by a power supplied from the battery pack, comprising:

switching means provided on a current path between one of charging/discharging terminal exposed to outside of the terminal device to be connected to a charging/discharging device when charging/discharging the battery pack and a battery cell in the battery pack, for opening and closing the current path;

switch driving means for controlling the switching means to close when the switch driving means receives a drive control signal from the charging/discharging device and for controlling the switching means to open when the switch driving means does not receive the drive control signal; and a control terminal for applying the drive control signal to the switch driving means when the battery pack is attached to the charging/discharging device.

2. A battery pack short-circuit protection circuit according to claim 1 wherein the drive control signal is generated within the charging/discharging device;

the control terminal is connected to the charging/discharging device simultaneously on connection of the charging/discharging terminal of the battery pack to the charging/discharging device; and the drive control signal generated in the charging/discharging device is applied to the switch driving means through the control terminal.

3. A battery pack short-circuit protection circuit according to claim 1, wherein the drive control signal is generated within an equipment on which the battery pack is mounted;

the control terminal is connected to the equipment when the battery pack is mounted on the equipment; and the drive control signal generated within the equipment is applied to the switch driving means through the control terminal.

4. A battery pack short-circuit protection circuit according to claim 3, wherein the equipment includes a charging/discharging control switch and, the drive control signal is generated when the charging/discharging control switch is enabled.

5. A battery pack short-circuit protection circuit according to claim 1, wherein the drive control signal is generated within the charging/discharging device and is generated within the equipment on which the battery pack is mounted; and the control terminal comprises:

a first control terminal to be connected to the charging/discharging device and a second control terminal to be connected to the equipment; and application of the drive control signal to the switch driving means is performed from the charging/discharging device through the first control terminal or from the equipment through the second control terminal.

6. A battery pack short-circuit protection circuit according to claim 1, wherein the switching means is provided on a current path that connects a plus terminal of the charging/discharging terminals and a plus terminal of the battery cell.

7. A battery pack short-circuit protection circuit according to claim 1, wherein the switching means is provided on a current path that connects a minus terminal of the charging/discharging terminals and a minus terminal of the battery cell.

8. A battery pack short-circuit protection circuit according to claim 3, wherein, an operating level of the switch driving means is set to a different value in accordance with the type of capacity of the battery cell of the battery pack in which the switch driving means is incorporated, and the charging/discharging device comprises:
drive control signal generating means for generating drive control signals of a plurality of levels;
decision means for deciding the type of capacity of the battery pack from a level of a drive control signal generated by the drive control signal generating means when the switch driving means is operated; and
charging/discharging control means for controlling charging/discharging of the battery cell of the battery pack in accordance with the type of capacity of the battery pack decided by the decision means.

9. A battery pack build in a terminal device, for supplying a drive power source, comprising:
a battery cell;
a plus charging/discharging terminal connected to a plus terminal of the battery cell through a first current path and exposed to outside of the terminal device that is connected to a charging/discharging device when the battery cell is charged or discharged;
a minus charging/discharging terminal connected to a minus terminal of the battery cell through a second current path and exposed to outside of the terminal device that is connected to the charging/discharging device when the battery cell is charged or discharged;
switching means provided on one of the first current path and the second current path, for opening and closing one of the first current path and the second current path;
switch driving means for controlling the switching means to close when the switch driving means receives a drive control signal from the charging/discharging device and for controlling the switching means to open when the switch driving means does not receive the drive control signal; and
a control terminal for applying the drive control signal to the switch driving means when the battery cell is charged or discharged.

10. A battery pack according to claim 9, wherein the drive control signal is generated within the charging/discharging device;
the control terminal is connected to the charging/discharging device simultaneously on connection of the charging/discharging terminal of the battery pack to the charging/discharging device; and
the drive control signal generated within the charging/discharging device is applied to the switch driving means through the control terminal.

11. A battery pack according to claim 9, wherein the drive control signal is generated within an equipment on which the battery pack is mounted;
the control terminal is connected to the equipment on mounting of the battery pack on the equipment; and
the drive control signal generated within the equipment is applied to the switch driving means through the control terminal.

12. A battery pack according to claim 11, wherein the equipment includes a charging/discharging control switch and, the drive control signal is generated when the charging/discharging control switch is enabled.

13. A battery pack according to claim 9, further comprising an over-current cut-off switch connected in series with the battery cell and whereby a charging/discharging current in respect of the battery cell is cut off if it exceeds a pre-set prescribed value.

14. A battery pack according to claim 9, further comprising:
temperature detection means provided within the battery pack, for detecting a temperature within the battery pack; and
a temperature detection terminal that transmits temperature information indicating the temperature detected by the temperature detection means to the charging/discharging device; and
the charging/discharging device comprises:
charging/discharging interruption controlling means for interrupting charging/discharging of the battery cell of the battery pack when the temperature indicated by the temperature information transmitted through the temperature detection terminal on charging/discharging of the battery cell of the battery pack exceeds a pre-set prescribed value.

15. A battery pack short-circuit protection method wherein a battery pack built in a terminal device is provided with switching means on a current path between a charging/discharging terminal of the battery pack, which is exposed to the outside of the terminal device, to be connected to a charging/discharging device and a battery cell within the battery pack, for opening and closing the current path, and provided with switch driving means for controlling the switching means to close when the switch driving means receives a drive control signal from the charging/discharging device and for controlling the switching means to open when the switch driving means does not receive the drive control signal, the method comprising:
a first step wherein the switching means is controlled to close by application of the drive control signal generated in the charging/discharging device to the switch driving means in a condition in which the battery pack is connected to the charging/discharging device for charging/discharging the battery cell of the battery pack; and
a second step wherein the switching means is controlled to open by the drive control signal generated by the charging/discharging device ceasing to be applied to the switch driving means in a condition in which the connection of the battery pack is removed from the charging/discharging device.

16. A battery pack short-circuit protection method wherein a battery pack built in a terminal device is provided with switching means on a current path between a charging/discharging terminal of the battery pack, which is exposed to the outside of the terminal device, to be connected to a charging/discharging device and a battery cell in the battery pack, for opening and closing the current path, and provided with switch driving means for controlling the switching means to close when the switch driving means receives a drive control signal and for controlling the switching means to open when the switch driving means does not receive the drive control signal, the method comprising:
a first step wherein the switching means is controlled to close by application of the drive control signal generated by an equipment to the switch driving means when the battery pack is connected to the charging/ discharging device for charging/discharging of the battery cell of the battery pack in a condition with the battery pack mounted on the equipment; and a second step wherein the switching means is controlled to open by the drive control signal generated by the equipment ceasing to be applied to the switch driving means on release of the connection of the battery pack from the charging/discharging device.

* * * * *